(12) United States Patent
Ihara et al.

(10) Patent No.: US 7,009,724 B1
(45) Date of Patent: Mar. 7, 2006

(54) IMAGE PRINT SYSTEM

(75) Inventors: Yushi Ihara, Kanagawa (JP); Yoshio Kitamura, Kanagawa (JP); Toshio Narushima, Kanagawa (JP); Makoto Niioka, Kanagawa (JP); Yuji Kawamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1028 days.

(21) Appl. No.: 09/786,180

(22) PCT Filed: Jul. 5, 2000

(86) PCT No.: PCT/JP00/04471

§ 371 (c)(1),
(2), (4) Date: Apr. 23, 2001

(87) PCT Pub. No.: WO01/03404

PCT Pub. Date: Jan. 11, 2001

(30) Foreign Application Priority Data

| Jul. 5, 1999 | (JP) | 11-191026 |
| Aug. 19, 1999 | (JP) | 11-233252 |
| Sep. 1, 1999 | (JP) | 11-248067 |
| Dec. 3, 1999 | (JP) | 11-345470 |

(51) Int. Cl.
G06F 15/00 (2006.01)
H04N 5/225 (2006.01)

(52) U.S. Cl. ............ 358/1.15; 358/1.15; 348/207.1; 348/552

(58) Field of Classification Search .............. 358/1.15; 725/38, 39, 140, 40; 348/207.1, 552, 478; 370/490, 419; 379/93.12
See application file for complete search history.

(56) References Cited

FOREIGN PATENT DOCUMENTS

| EP | 0 651 550 | 5/1995 |
| EP | 0 859 323 | 8/1998 |
| JP | 6-70244 | 3/1994 |
| JP | 11-15771 | 1/1999 |
| WO | WO 97 27698 | 7/1997 |

*Primary Examiner*—Kimberly Williams
*Assistant Examiner*—Saeid Ebrahimi-Dehkordy
(74) *Attorney, Agent, or Firm*—Frommer Lawrence & Haug LLP; William S. Frommer

(57) ABSTRACT

An image-printing system for printing a fine image represented by digital image data, which is being displayed by a television receiver. The system comprises an image-processing section 13, an image output section 13, a printer apparatus 5, and a printing control section 23. The image-processing section 13 processes an externally input image signal, generating image data. The image output section 13 outputs a packet to the printer apparatus 5. The packet complies with the IEEE (The Institute of Electrical and Electronic Engineers) 1394 standards and contains the image data generated by the image-processing section 13. The printing control section 23 controls the printer apparatus 5 so that the apparatus 5 may print the data represented by the image data contained in the packet that the image output section 13 has output to the printer apparatus 5.

26 Claims, 19 Drawing Sheets

| | pixel_x | pixel_y | interlaced/progressive | pixel format | screen aspect ratio | pixel aspect ratio | based standard | image size |
|---|---|---|---|---|---|---|---|---|
| 1080_422_16×9 | 1920 | 1080 | interlaced/progressive | YCbCr 4:2:2 | 16:9 | 1:1 | ITU-R BT.709-2 | 3.96MB |
| 1080_420_16×9 | 1920 | 1080 | interlaced/progressive | YCbCr 4:2:0 | 16:9 | 1:1 | ITU-R BT.709-2 | 2.97MB |
| 720_422_16×9 | 1280 | 720 | progressive | YCbCr 4:2:2 | 16:9 | 1:1 | ANSI/SMPTE 296M-1997 | 1.76MB |
| 720_420_16×9 | 1280 | 720 | progressive | YCbCr 4:2:0 | 16:9 | 1:1 | ANSI/SMPTE 296M-1997 | 1.32MB |
| 576_422_4×3 | 720 | 576 | interlaced/progressive | YCbCr 4:2:2 | 4:3 | 1.07:1 | ITU-R BT.1203 | 810KB |
| 576_420_4×3 | 720 | 576 | interlaced/progressive | YCbCr 4:2:0 | 4:3 | 1.07:1 | ITU-R BT.1203 | 608KB |
| 480_422_16×9 | 720 | 480 | interlaced/progressive | YCbCr 4:2:2 | 16:9 | 1.19:1 | ITU-R BT.709-2 | 675KB |
| 480_420_16×9 | 720 | 480 | interlaced/progressive | YCbCr 4:2:0 | 16:9 | 1.19:1 | ITU-R BT.709-2 | 506KB |
| 480_422_4×3 | 720 | 480 | interlaced/progressive | YCbCr 4:2:2 | 4:3 | 0.89:1 | ITU-R BT.601-4 | 575KB |
| 480_420_4×3 | 720 | 480 | interlaced/progressive | YCbCr 4:2:0 | 4:3 | 0.89:1 | ITU-R BT.601-4 | 506KB |

FIG.6

| | msb | | | | | | lsb |
|---|---|---|---|---|---|---|---|
| opcode | \multicolumn{7}{c}{CAPTURE($42_{16}$)} |
| operand [0] | \multicolumn{7}{c}{subfunction} |
| operand [1] | \multicolumn{4}{c}{source_subunit_type} | \multicolumn{3}{c}{source_subunit_ID} |
| operand [2] | \multicolumn{7}{c}{source_plug} |
| operand [3] | \multicolumn{7}{c}{status} |
| operand [4] | \multicolumn{7}{c}{dest_plug} |
| operand [5] | | | | | | | |
| ⋮ | \multicolumn{7}{c}{print_job_ID} |
| operand [16] | | | | | | | |
| operand [17] | | | | | | | |
| operand [18] | \multicolumn{7}{c}{data_size} |
| operand [19] | | | | | | | |
| operand [20] | | | | | | | |
| operand [21] | \multicolumn{7}{c}{image_size_x} |
| operand [22] | | | | | | | |
| operand [23] | \multicolumn{7}{c}{image_size_y} |
| operand [24] | | | | | | | |
| operand [25] | \multicolumn{7}{c}{image_format_specifier} |
| operand [26] | | | | | | | |
| operand [27] | | | | | | | |
| operand [28] | \multicolumn{7}{c}{reserved} |
| operand [29] | | | | | | | |
| operand [30] | \multicolumn{7}{c}{next_pic} |
| operand [31] | \multicolumn{7}{c}{next_page} |
| operand [32] | | | | | | | |

FIG.7

| value | Type | Meaning |
|---|---|---|
| $20_{16}$ | 1080i _ 422plane _ 16×9 | |
| $21_{16}$ | 1080p _ 422plane _ 16×9 | |
| $22_{16}$ | 720p _ 422plane _ 16×9 | |
| $23_{16}$ | 480i _ 422plane _ 16×9 | |
| $24_{16}$ | 480p _ 422plane _ 16×9 | |
| $25_{16}$ | 480i _ 422plane _ 4×3 | |
| $26_{16}$ | 480p _ 422plane _ 4×3 | |
| $28_{16}$ | 1080i _ 422line _ 16×9 | |
| $29_{16}$ | 1080p _ 422line _ 16×9 | |
| $2A_{16}$ | 720p _ 422line _ 16×9 | |
| $2B_{16}$ | 480i _ 422line _ 16×9 | |
| $2C_{16}$ | 480p _ 422line _ 16×9 | |
| $2D_{16}$ | 480i _ 422line _ 4×3 | |
| $2E_{16}$ | 480p _ 422line _ 4×3 | |
| $30_{16}$ | 1080i _ 420plane _ 16×9 | |
| $31_{16}$ | 1080p _ 420plane _ 16×9 | |
| $32_{16}$ | 720p _ 420plane _ 16×9 | |
| $33_{16}$ | 480i _ 420plane _ 16×9 | |
| $34_{16}$ | 480p _ 420plane _ 16×9 | |
| $35_{16}$ | 480i _ 420plane _ 4×3 | |
| $36_{16}$ | 480p _ 420plane _ 4×3 | |
| $38_{16}$ | 1080i _ 420line _ 16×9 | |
| $39_{16}$ | 1080p _ 420line _ 16×9 | |
| $3A_{16}$ | 720p _ 420line _ 16×9 | |
| $3B_{16}$ | 480i _ 420line _ 16×9 | |
| $3C_{16}$ | 480p _ 420line _ 16×9 | |
| $3D_{16}$ | 480i _ 420line _ 4×3 | |
| $3E_{16}$ | 480p _ 420line _ 4×3 | |
| $60_{16}$ | Text(ASCII) | MD-clip ASCII |
| $61_{16}$ | Text(ISO8859-1) | MD-clip modified ISO8859-1 |
| $62_{16}$ | Text(Music Shifted JIS) | MD-clip Music Shifted JIS |

FIG.8

| Value(MSB) | Value(LSB) | Type | Meaning |
|---|---|---|---|
| $00_{16}$ | | | |
| | $00_{16}$ | sRGB raw | sRGB raw |
| | $01_{16}$ | sRGB raw,quadlet | |
| $01_{16}$ | | | |
| | $0X_{16}$ | YCC4:2:2 raw/pixel | YCC raw |
| | $1X_{16}$ | YCC4:2:2 raw/line | |
| | $8X_{16}$ | YCC4:2:0 raw/pixel | |
| | $9X_{16}$ | YCC4:2:0 raw/line | |
| | $X0_{16}$ | Pixel ratio 1.00×1.00 / ITU-R BT.709-2 / interlace | |
| | $X1_{16}$ | Pixel ratio 1.19×1.00 / ITU-R BT.709-2 / interlace | |
| | $X2_{16}$ | Pixel ratio 0.89×1.00 / ITU-R BT.709-2 / interlace | |
| | $X3_{16}$ | Pixel ratio 0.89×1.00 / ITU-R BT.601-4 / interlace | |
| | $X4_{16}$ | Pixel ratio 1.07×1.00 / ITU-R BT.1203 / interlace | |
| | $X8_{16}$ | Pixel ratio 1.00×1.00 / ITU-R BT.709-2 / progressive | |
| | $X9_{16}$ | Pixel ratio 1.19×1.00 / ITU-R BT.709-2 / progressive | |
| | $XA_{16}$ | Pixel ratio 0.89×1.00 / ITU-R BT.709-2 / progressive | |
| | $XB_{16}$ | Pixel ratio 0.89×1.00 / ITU-R BT.601-4 / progressive | |
| | $XC_{16}$ | Pixel ratio 1.07×1.00 / ITU-R BT.1203 / progressive | |
| $10_{16}$ | | | DCF Object |
| | $00_{16}$ | Exif 2.1 | |
| | $01_{16}$ | JFIF | |
| | $02_{16}$ | TIFF | |
| | $0F_{16}$ | JPEG | |
| $80_{16} \sim 8F_{16}$ | $00_{16} \sim FF_{16}$ | Vendor Dependent format | |
| $FE_{16}$ | | Unit Plug defined | Special meaning |
| | $00_{16}$ | | |
| | $01_{16}$ | don't care | |

FIG.9

| $Y_1(L_1)$ | $Y_2(L_1)$ | $Cb_1(L_1)$ | $Cr_1(L_1)$ |
|---|---|---|---|
| $Y_3(L_1)$ | $Y_4(L_1)$ | $Cb_3(L_1)$ | $Cr_3(L_1)$ |
| | ⋮ | | |
| $Y_{N-1}(L_1)$ | $Y_N(L_1)$ | $Cb_{N-1}(L_1)$ | $Cr_{N-1}(L_1)$ |
| $Y_1(L_2)$ | $Y_2(L_2)$ | $Cb_1(L_2)$ | $Cr_1(L_2)$ |
| | ⋮ | | |
| $Y_{N-1}(L_M)$ | $Y_N(L_M)$ | $Cb_{N-1}(L_M)$ | $Cr_{N-1}(L_M)$ |

FIG.10

| $Y_1(L_1)$ | $Y_2(L_1)$ | $Y_1(L_2)$ | $Y_2(L_2)$ |
|---|---|---|---|
| $Cb_1(L_1)$ | $Cb_1(L_1)$ | $Y_3(L_1)$ | $Y_4(L_1)$ |
| $Y_3(L_2)$ | $Y_4(L_2)$ | $Cb_3(L_1)$ | $Cr_3(L_1)$ |
| | ⋮ | | |
| $Y_{N-3}(L_{M-1})$ | $Y_{N-2}(L_{M-1})$ | $Y_{N-3}(L_M)$ | $Y_{N-2}(L_M)$ |
| $Cb_{N-3}(L_{M-1})$ | $Cr_{N-3}(L_{M-1})$ | $Y_{N-1}(L_{M-1})$ | $Y_N(L_{M-1})$ |
| $Y_{N-1}(L_M)$ | $Y_N(L_M)$ | $Cb_{N-1}(L_{M-1})$ | $Cr_{N-1}(L_{M-1})$ |

FIG.11

| $Y_1(L_1)$ | $Y_2(L_1)$ | $Y_3(L_1)$ | $Y_4(L_1)$ |
|---|---|---|---|
| ⋮ | ⋮ | ⋮ | ⋮ |
| $Y_{N-3}(L_1)$ | $Y_{N-2}(L_1)$ | $Y_{N-1}(L_1)$ | $Y_N(L_1)$ |
| $Cb_1(L_1)$ | $Cr_1(L_1)$ | $Cb_3(L_2)$ | $Cr_3(L_1)$ |
| ⋮ | ⋮ | ⋮ | ⋮ |
| $Cb_{N-3}(L_1)$ | $Cr_{N-3}(L_1)$ | $Cb_{N-1}(L_1)$ | $Cr_{N-1}(L_1)$ |
| $Y_1(L_2)$ | $Y_2(L_2)$ | $Y_3(L_1)$ | $Y_4(L_1)$ |
| ⋮ | ⋮ | ⋮ | ⋮ |
| $Cb_{N-3}(L_M)$ | $Cr_{N-3}(L_M)$ | $Cb_{N-1}(L_M)$ | $Cr_{N-1}(L_M)$ |

FIG.12

| $Y_1(L_1)$ | $Y_2(L_1)$ | $Y_3(L_1)$ | $Y_4(L_1)$ |
|---|---|---|---|
| ⋮ | | | |
| $Y_{N-3}(L_1)$ | $Y_{N-2}(L_1)$ | $Y_{N-1}(L_1)$ | $Y_N(L_1)$ |
| $Y_1(L_2)$ | $Y_2(L_2)$ | $Y_3(L_2)$ | $Y_4(L_2)$ |
| ⋮ | | | |
| $Y_{N-3}(L_2)$ | $Y_{N-2}(L_2)$ | $Y_{N-1}(L_2)$ | $Y_N(L_2)$ |
| $Cb_1(L_1)$ | $Cr_1(L_1)$ | $Cb_3(L_1)$ | $Cr_3(L_1)$ |
| ⋮ | | | |
| $Cb_{N-3}(L_1)$ | $Cr_{N-3}(L_1)$ | $Cb_{N-1}(L_1)$ | $Cr_{N-1}(L_1)$ |
| $Y_1(L_3)$ | $Y_2(L_3)$ | $Y_3(L_3)$ | $Y_4(L_3)$ |
| ⋮ | | | |
| $Cb_{N-3}(L_{M-1})$ | $Cr_{N-3}(L_{M-1})$ | $Cb_{N-1}(L_{M-1})$ | $Cr_{N-1}(L_{M-1})$ |

FIG.13

| Address Offset | 1st byte | 2nd byte | 3rd byte | 4th byte |
|---|---|---|---|---|
| 00 00 00 00 $_{16}$ | Y1(L1) | Y2(L1) | Cb1(L1) | Cr1(L1) |
| 00 00 00 04 $_{16}$ | Y3(L1) | Y4(L1) | Cb3(L1) | Cr3(L1) |
| ... | | | | |
| 00 00 05 9C $_{16}$ | Y719(L1) | Y720(L1) | Cb719(L1) | Cr719(L1) |
| 00 00 05 A0 $_{16}$ | Y1(L2) | Y2(L2) | Cb1(L2) | Cr1(L2) |
| ... | | | | |
| 00 0A 8B FC $_{16}$ | Y719(L480) | Y720(L480) | Cb719(L480) | Cr719(L480) |

FIG.14

| Address Offset | 1st byte | 2nd byte | 3rd byte | 4th byte |
|---|---|---|---|---|
| 00 00 00 00₁₆ | Y1(L1) | Y2(L1) | Y1(L2) | Y2(L2) |
| 00 00 00 04₁₆ | Cr1(L1) | Cr1(L1) | Y3(L1) | Y4(L1) |
| 00 00 00 08₁₆ | Y3(L2) | Y4(L2) | Cb3(L1) | Cr3(L1) |
| ... | ... | ... | ... | ... |
| 00 07 E8 F8₁₆ | Cb717(L479) | Cr717(L479) | Y719(L479) | Y720(L479) |
| 00 07 E8 FC₁₆ | Y719(L480) | Y720(L480) | Cb719(L479) | Cr719(L479) |

FIG.15

| Address Offset | 1st byte | 2nd byte | 3rd byte | 4th byte |
|---|---|---|---|---|
| 00 00 00 00$_{16}$ | Y1(L1) | Y2(L1) | Y3(L1) | Y4(L1) |
| ... | | | | |
| 00 00 02 CF$_{16}$ | Y717(L1) | Y718(L1) | Y719(L1) | Y720(L1) |
| 00 00 02 D0$_{16}$ | Cb1(L1) | Cr1(L1) | Cb3(L1) | Cr3(L1) |
| ... | | | | |
| 00 00 05 9F$_{16}$ | Cb717(L1) | Cr717(L1) | Cb719(L1) | Cr719(L1) |
| 00 00 05 A0$_{16}$ | Y1(L2) | Y2(L2) | Y3(L2) | Y4(L2) |
| ... | | | | |
| 00 0A 8B FC$_{16}$ | Cb717(L480) | Cr717(L480) | Cb719(L480) | Cr719(L480) |

FIG.16

| Address Offset | 1st byte | 2nd byte | 3rd byte | 4th byte |
|---|---|---|---|---|
| 00 00 00 00$_{16}$ | Y1(L1) | Y2(L1) | Y3(L1) | Y4(L1) |
| ... | | | | |
| 00 00 02 CF$_{16}$ | Y717(L1) | Y718(L1) | Y719(L1) | Y720(L1) |
| 00 00 02 D0$_{16}$ | Y1(L2) | Y2(L2) | Y3(L2) | Y4(L2) |
| ... | | | | |
| 00 00 05 9F$_{16}$ | Y717(L2) | Y718(L2) | Y719(L2) | Y720(L2) |
| 00 00 05 A0$_{16}$ | Cb1(L1) | Cr1(L1) | Cb3(L1) | Cr3(L1) |
| ... | | | | |
| 00 00 08 6F$_{16}$ | Cb717(L1) | Cr717(L1) | Cb719(L1) | Cr719(L1) |
| 00 00 08 70$_{16}$ | Y1(L3) | Y2(L3) | Y3(L3) | Y4(L3) |
| ... | | | | |
| 00 07 E8 FC$_{16}$ | Cb717(L479) | Cr717(L479) | Cb719(L479) | Cr719(L479) |

FIG.17

IMAGE PRINT SYSTEM

TECHNICAL FIELD

The present invention relates to an image-processing apparatus, an image-processing method, a printing apparatus, a printing method, an image-printing system, an image-printing method and a medium storing image-processing and printing programs, all for use in a system in which a printer apparatus connected by an interface of digital serial bus type that complies with, for example, IEEE (The Institute of Electrical and Electronics Engineers) 1394 standards, prints images.

BACKGROUND ART

The IEEE (The Institute of Electrical and Electronics Engineers) 1394 standards define the physical and electrical standards of connectors designed for use in various apparatuses to connect the apparatuses to one another. Once an apparatus that has an interface complying with the IEEE1394 standards is physically connected to another apparatus having such an interface, it can achieve hot plug and play and the like, accomplishing high-speed transfer of digital data and automatic setting of connection between the apparatuses. This is why the IEEE1394 standards have been adopted as common serial-interface standards in the industries.

STBs (Set Top Boxes), television receivers, printer apparatuses are known, each having an interface that complies with the above-mentioned IEEE1394 standards.

A method of transmitting Iso packets complying with the IEEE1394 standards, each containing luminance signals and color-difference signals, is disclosed in Jpn. Pat. Appln. Laid-Open Publication No. 10-126426. A printer apparatus complying with the IEEE1394 standards is disclosed in Jpn. Pat. Appln. Laid-Open Publication No. 10-285246.

However, neither a television receivers nor an STB has been connected to a printer apparatus by interfaces complying with the IEEE1394 standards so that the printer apparatus may print the image being displayed by the television receiver.

Hitherto, to print the image displayed by a television receiver by means of a printer apparatus, an interface capable of receiving NTSC (National Television System Committee) signals, i.e., analog signals, from the television receiver or an STB is incorporated in the printer apparatus, and the analog signals are transferred to the printer apparatus, which prints the image being displayed by the television receiver. The analog signals transferred to the printer apparatus have generated by converting digital signals in the television receiver or the STB. The analog signals, thus generated, are deteriorated in quality, disabling the printer apparatus to print fine characters and the like.

To enable the printer apparatus to print the image that the television receiver displays, many printing parameters are set in the television receiver or the STB in most cases. The process-burden on the television receiver or the STB inevitably grows.

The applicant proposed the techniques described in Japanese Patent Application No. 11-191026, Japanese Patent Application No. 11-233252, Japanese Patent Application No. 11-248067 and Japanese Patent Application No. 11-345470, based on which priority is claimed to the present application, to IEEE1394 Trade Association, for the purpose of standardization. IEEE1394 Trade Association disclosed these techniques in the form of the following drafts:

AV/C Printer Subunit Specification Version 1.0 Draft 0.97: 60 (2Q00 AVWG Off-Cycle Meeting on May 24–25, 2000)

AV/C Printer Subunit Specification Version 1.0 Draft 0.7: 5 (1Q00 TA QM AV-WG on Jan. 18, 2000)

AV/C Printer Subunit Specification Version 1.0 Draft 0.5: 145 (3Q99 TA QM AVWG Meeting on Jul. 28–30, 1999)

DISCLOSURE OF THE INVENTION

An object of the invention is to provide an image-processing apparatus and an image-processing method that serve to print fine images represented by digital image data, which are displayed by television receivers.

Another object of this invention is to provide a printing apparatus and a printing method that serve to print fine images represented by digital image data, which are displayed by television receivers.

Another object of the invention is to provide an image-printing apparatus and an image-printing method that serve to print fine images represented by digital image data, which are displayed by television receivers.

Still another object of the present invention is to provide a medium storing programs for printing fine images represented by digital image data, which are displayed by television receivers.

To attain the objects described above, an image-processing apparatus according to the invention comprises: image-processing means for processing an externally input image signal, thereby to generate image data; and image output means for outputting a packet to an printer apparatus, said packet complying with a predetermined digital serial bus system. The image output means outputs a capture command which is contained in the packet and which designates the transmission of desired still-picture data based on the image data. The image output means also describes, in the capture command, the image type data representing the format of the still-picture data.

An image-processing apparatus according to this invention is characterized in the following respects. An externally input image signal is processed, thereby generating image data. The image data is inserted into a packet to an printing apparatus that complies with a predetermined digital serial bus system. A capture command that designates transmission of still-picture data generated from the image data is inserted into the packet. Image-type data that represents a format of the still-picture data is described in the capture command. The packet is then output to a printing apparatus.

A printing apparatus according to the present invention comprises image input means, image-converting means, and printing means. The image input means receives image data of a prescribed format, which is contained in a packet complying with a predetermined digital serial bus system. The image-converting means converts the format of the image data input to the image input means to a format for printing. The printing means prints still-picture image data based on the image data of the format converted by the image-converting means. The packet contains a capture command designating transmission of the still-picture data, and image-type data representing the format of the still-picture data is described in the capture command. The image-converting means converts the format in accordance with the image-type data described in the capture command.

A printing method according to the invention is characterized in the following respects. A packet is received, which complies with a predetermined digital serial bus system and which contains image data and a capture command designating transmission of still-picture data based on the image data. The format of the image data received is converted to a format for printing, in accordance with image-type data described in the capture command and representing the format of the still-picture data received. Still-picture image data based on the image data of the format converted is printed.

An image-printing system according to the invention comprises image-processing apparatus and a printing apparatus. The image-processing apparatus comprises image-processing means for processing an externally input image signal, thereby to generate image data, and image output means for outputting a packet to an printing apparatus, said packet complying with a predetermined digital serial bus system and containing the image data generated by the image-processing means. The image output means outputs the packet, after inserting, into the packet, a capture command designating transmission of still-picture data generated from the image data, and describing, in the capture command, image-type data representing a format of the still-picture data. The printing apparatus comprises image input means for receiving image data of a prescribed format, which is contained in a packet complying with a predetermined digital serial bus system, image-converting means for converting the format of the image data input to the image input means to a format for printing, and printing means for printing still-picture image data based on the image data of the format converted by the image-converting means. The image-converting means converts the format in accordance with the image-type data described in the capture command.

An image-printing method according to this invention is characterized in the following respects. An externally input image signal is processed, thereby to generate image data. The image data generated is inserted into a packet that complies with a predetermined digital serial bus system. A capture command designating transmission of still-picture data generated from the image data is inserted into the packet. The image-type data representing a format of the still-picture data is described in the capture command. The packet is then transmitted. Further, the packet complying with the predetermined digital serial bus system and containing the image data and the capture command is received. The format of the image data received is converted to a format for printing, in accordance with image-type data described in the capture command and representing the format of the still-picture data received. Still-picture image data based on the image data of the format converted is printed.

A storage medium according to the invention stores an image-processing program. The program describes the steps of: processing an externally input image signal, thereby to generate image data; inserting the image data generated, into a packet that complies with a predetermined digital serial bus system; inserting, into the packet, a capture command designating transmission of still-picture data generated from the image data, and describing, in the capture command, image-type data representing a format of the still-picture data; and outputting the packet to a printing apparatus.

Another storage medium according to the present invention stores an image-processing program. The program describes the steps of: receiving a packet complying with a predetermined digital serial bus system and containing image data and a capture command; converting the format of the image data received, to a format for printing, in accordance with image-type data described in the capture command and representing the format of still-picture data received; and printing still-picture image data based on the image data of the format converted.

BRIEF DESCRIPTION OF THE DRAWINGS

FIG. 6 is a diagram explaining the image type of a still picture;

FIG. 7 is a diagram showing the data configuration of an asynchronous packet that contains a capture command;

FIG. 8 is a diagram explaining the names of image types, which are stored in image_format_specifiers;

FIG. 9 is a diagram showing other names of other image types, which are stored in image_format_specifiers;

FIG. 10 is a diagram explaining the sequence of transmitting still-picture data of YCC4:2:2 pixel format is transmitted, a point after another, to a printer apparatus;

FIG. 11 is a diagram explaining the sequence of transmitting still-picture data of YCC4:2:0 pixel format is transmitted, a point after another, to a printer apparatus;

FIG. 12 is a diagram explaining the sequence of transmitting still-picture data of YCC4:2:2 pixel format is transmitted, a line after another, to a printer apparatus;

FIG. 13 is a diagram explaining the sequence of transmitting still-picture data of YCC4:2:0 pixel format is transmitted, a line after another, to a printer apparatus;

FIG. 14 is a diagram explaining how a still picture of 480_422_4×3 is transmitted, a point after another;

FIG. 15 is a diagram explaining how a still picture of 480_420_4×3 is transmitted, a point after another;

FIG. 16 is a diagram explaining how a still picture of 480_422_4×3 is transmitted, a line after another;

FIG. 17 is a diagram explaining how a still picture of 480_420_4×3 is transmitted, a line after another;

BEST MODE FOR CARRYING OUT THE INVENTION

Embodiments of the present invention will be described in detail, with reference to the accompanying drawings.

Figure 1:
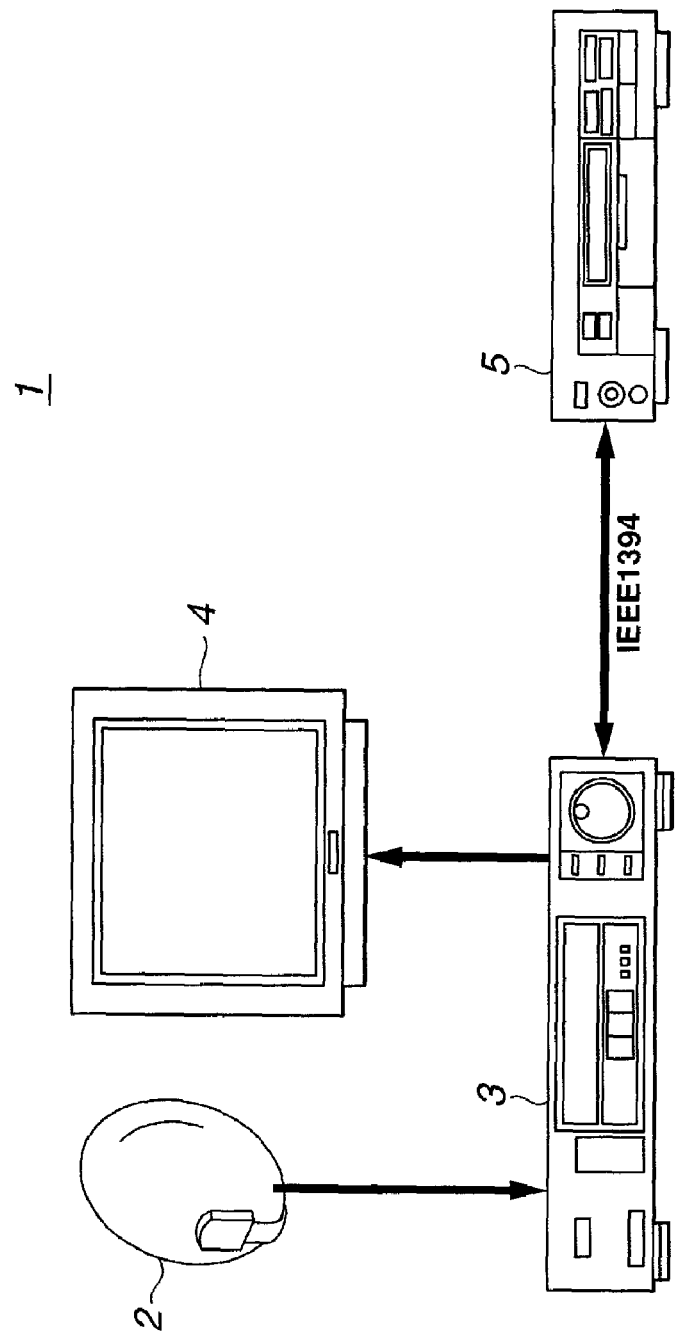
FIG. 1 is a diagram illustrating an image-printing system according to the present invention.

An image-printing system according to the present invention has, for example, the structure shown in FIG. 1.

The image-printing system 1 comprises an antenna 1, an STB (Set Top Box) 3, a television receiver 4, and a printer apparatus 5. The antenna 2 receives signals representing moving pictures and broadcast by the use of, for example, communications satellites. The STB 3 performs specific processes on the moving-image data the antenna 2 has received. The television receiver 4 displays the moving pictures and still pictures. The printer apparatus 5 prints images displayed by the television receiver 4.

In operation, the antenna 2 receives a video signal representing a moving picture and outputs the video signal to the STB 3. The video signal the antenna 2 receives consists of image signals of many channels, which are superimposed one upon another. The video signal is moving-picture data that has been compressed by, for example, the MPEG (Moving Picture Experts Group) system and encrypted by a prescribed encryption system.

The television receiver 4 displays a moving picture represented by moving-picture data of the NTSC (National Television System Committee) system, which has been supplied to the receiver 4 through the STB 3. The television receiver 4 may be a high-definition TV (HDTV) receiver. If so, the television receiver 4 displays a moving picture when it receives, from the STB 3, moving-picture data complying with the HD (High Definition) standards. Further, the STB 3 controls the display mode of the television receiver 4, whereby the receiver 4 can display still pictures and other data such as text data.

Figure 2:
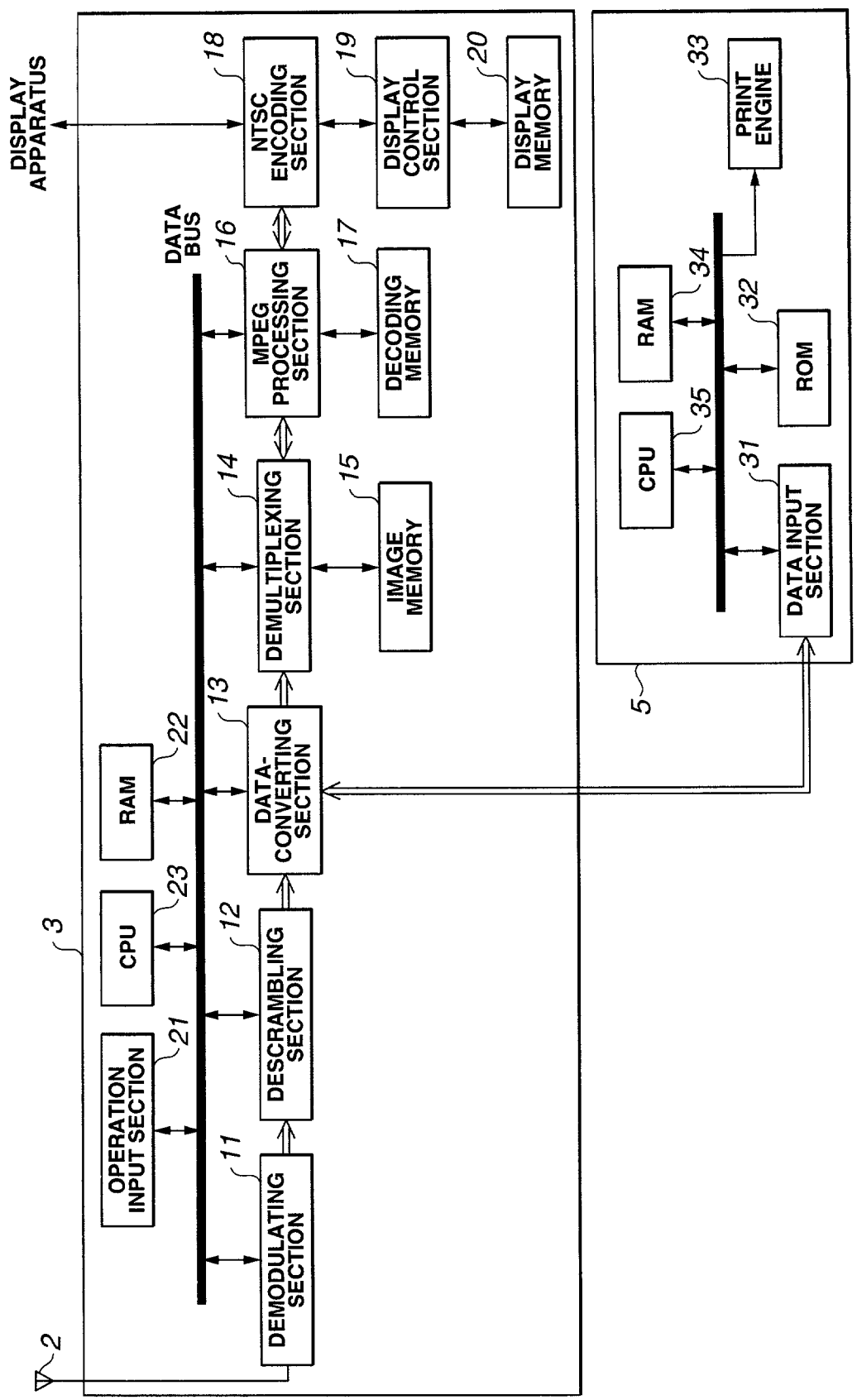
FIG. 2 is a block diagram of the STB and printer apparatus, both provided in the image-printing system according to the invention.

As shown in FIG. 2, the STB 3 comprises a demodulating section 11, a descrambling section 12, a data-converting section 13, a demultiplexing section 14, an image memory 15, an MPEG processing section 16, and a decoding memory 17. The STB 3 further comprises an NTSC encoding section 18, a display control section 19, a display memory 20, an operation input section 21, a RAM (Random Access Memory) 22, and a CPU (Central Processing Unit) 23. The demodulating section 11 demodulates the video signal the antenna 2 has received. The descrambling section 12 decrypts moving-picture data. The data-converting section 13 converts data that complies with the IEEE1394 standards. The demultiplexing section 14 performs a process such as the process of extracting moving-picture data of a prescribed channel. The MPEG processing section 16 decode data. The NTSC encoding section 18 converts data to one that can be displayed by the television receiver 4. The operation input section 21 receives instructions made by the user. The CPU 23 controls the other components of the STB 3.

In the STB 3, the demodulating section 11, descrambling section 12, data-converting section 13, demultiplexing section 14, MPEG processing section 16, operation input section 21, RAM 22, and CPU 23 are connected to a bus. Using the bus, the CPU 23 controls the other components of the STB 3.

The demodulating section 11 receives a video signal from the antenna 2. The video signal is an analog data that represents, for example, a stream of moving pictures. The demodulating section 11 performs demodulation and A/D (Analog-to-Digital) conversion on the video signal supplied from the antenna 2, thereby generating digital moving-picture data. The moving-picture data, thus generated, is output to the descrambling section 12. The demodulating section 11 receives a control signal, too, which is supplied from the CPU 23 through the bus. In accordance with the control signal, the demodulating section 11 carries out the demodulation and A/D conversion.

The descrambling section 12 decrypts the moving-picture data supplied from the demodulating section 11. More precisely, the descrambling section 12 receives the moving-picture data that has been encrypted. The section 12 then decrypts the moving-picture data in accordance with the encryption algorithm prepared to decrypt the moving-picture data. The descrambling section 12 outputs the moving-picture data, thus decrypted, to the data-converting section 13. The section 12 receives a control signal from the CPU 23 through the bus. The descrambling section 12 uses, for example, the decryption key contained in this control signal, to decrypt the moving-picture data.

The data-converting section 13 comprises an interface that complies with, for example, the IEEE1394 standards. The data-converting section 13 performs signal processing complying with the IEEE1394 standards, on the moving-picture data supplied from the descrambling section 12, in accordance with the control signal supplied from the CPU 23. The data-converting section 13 generates an IEEE1394-complyng data packet that contains the input moving-picture data or still-picture data. The data-converting section 13 generates an isochronous data packet, in order to transmit data continuous in time, such as moving-picture data. To transmit static data, such as still-picture data, commands or connection-setting data, the section 13 generates an asynchronous packet 100 of the type shown in FIG. 3.

Figures 3, 4:
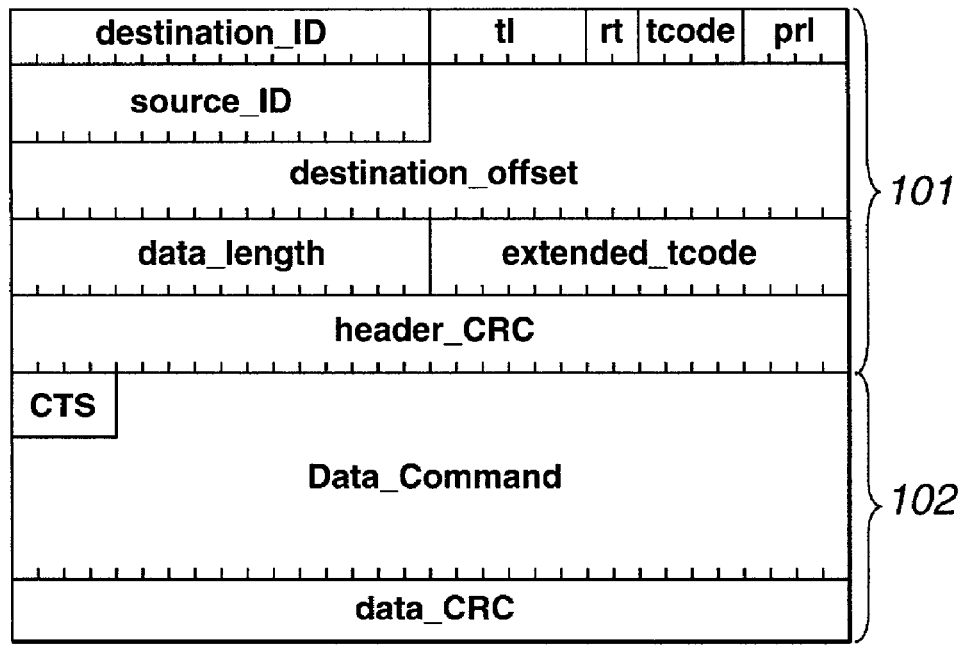
FIG. 3 is a diagram depicting an asynchronous packet transferred between the STB and the printer apparatus.
FIG. 4 is a diagram representing the data section of the asynchronous packet.

The asynchronous packet 100 shown in FIG. 3 has a header section 101 and a data section 102. The header section 101 complies with the IEEE1394 standards.

The header section 101 contains a destination ID (destination ID), a transaction label (tl: transaction label), a retry code (rt: retry code), a transaction code (tcode: transaction code), priority (pri: priority), a source ID (source_ID), a destination_offset, a data-field length (data_length), an extended transaction code (extended_tcode: extended transaction code), and a header CRC (header CRC; CRC of header field). The destination ID is the ID of the side that receives the packet, i.e., the ID of the printer apparatus 5. The source ID is the ID of the side that transmits the packet, i.e., the ID of the STB 3. The destination_offset designates a memory address in the packet-receiving side. The header CRC designates the CRC for the header section 101.

The data section 102 contains a data field and a data CRC (data_CRC). The data field is provided to store data that accords with the FCP (Function Control Protocol) and the AV/C protocol. The data CRC designates the CRC for the data section 102.

As shown in FIG. 4, the data field contains a CTS (Command Transaction Set), a command type (command type), a subunit type (subunit_type), and a subunit ID (subunit_ID). The CTS is information complying with the FCP. The subunit type designates the type of the subunit provided in packet-receiving side. The subunit ID is the ID of the subunit provided in the packet-receiving side. The subunit of the packet-receiving side is the data input section 31 of the printer apparatus 5. The type of the packet-receiving side is represented as "00010" in the case of the printer apparatus 5.

The data field contains an operation code and operands [0] to [n], which follow the subunit ID. The operation code indicates the kind of the operation to be performed on the operands [0] to [n]. In the data field, there are stored the still-picture data to be transmitted to the printer apparatus 5 and the AV/C command to be given to the printer apparatus 5. The command stored in the data field is one included in a command set called "AV/C command", which is used to control the printer apparatus 5. The CTS classifies the FCP.

If the packet to be transmitted is a command the value of which is "0000", the AV/C command defined by the AV/C digital interface command set of the IEEE1394 is stored in the data section 102.

The data-converting section 13 transmits isosynchronous packets at regular intervals in order to output an asynchronous packet to external apparatus.

Figure 5:
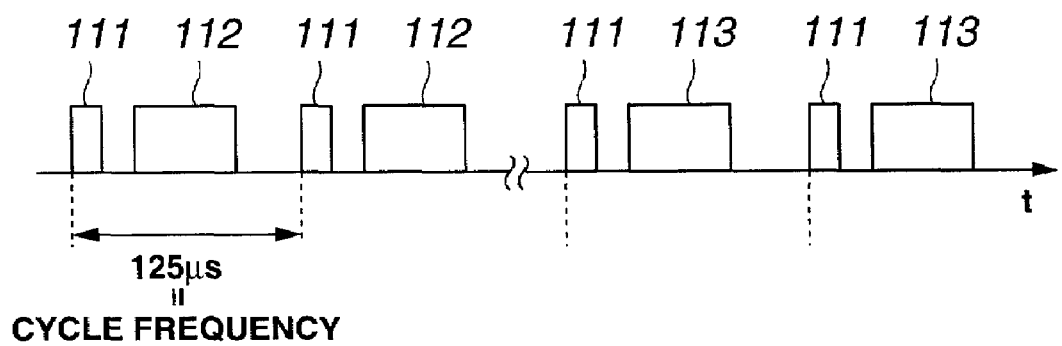
FIG. 5 is a timing chart explaining how the asynchronous packet is transmitted from a data-converting section to a data input section.

If the asynchronous packet 100 contains the still-picture data to be printed by the printer apparatus 5, the data-converting section 13 transmits the packet 100 at a cycle frequency of 125 microseconds as is illustrated in FIG. 5. The data-converting section 13 first transmits a cycle start packet 111, i.e., the asynchronous packet 100 containing, in its header section 101, the cycle time data (cycle time data) that indicates the cycle start (cycle start). The data-converting section 13 then transmits, within a prescribed time gap, a command packet 112 whose data section 102 contains a capture command that designates the transmission of the still-picture data. Next, he data-converting section 13 transmits a data packet 113 containing still-picture data in its data section 102, to the printer apparatus 5 that has received the capture command.

At this time, the data-converting section 13 outputs the still-picture data to the printer apparatus 5, in accordance with asynchronous arbitration. That is, the section 13 outputs the asynchronous packet 100 containing the still-picture data upon receipt of a response from the printer apparatus 5, thereby transmitting the sill-picture data to the printer apparatus 5.

More specifically, the data-converting section 13 effects processes in the transaction layer, link layer and physical layer under the control of a serial bus that accords with the IEEE1394 standards. Therefore, the data-converting section 13 sets the connection with the printer apparatus 5 in accordance with a control signal supplied from the CPU 23. Moreover, the section 13 generates an asynchronous packet 100 that contains the still-picture data and an overhead, i.e., control data. Thus, the section 13 transmits one asynchronous packet 100 at each cycle to the printer apparatus 5 that is connected in compliance with the IEEE1394 standards.

To enable the television receiver 4 to display the moving-picture data the STB 3 has received, without processing the data in accordance with the IEEE1394 standards, the data-converting section 13 outputs the moving-picture data supplied from the descrambling section 12, to the demultiplexing section 14, in accordance with the control signal supplied from the CPU 23.

The demultiplexing section 14 selects the channel designated by the CPU 23, from the channels superimposed on the moving-picture data supplied from the data-converting section 13. Only the moving-picture data of the channel selected is output from the section 14 to the MPEG processing section 16.

Under the control of the CPU 23, the demultiplexing section 14 stores into the image memory 15 the still-picture data, which has been, input from the MPEG processing section 16 and which consists of luminance data and color-difference data. Under the control of the CPU 23, too, the section 14 outputs the still-picture data to the data-converting section 13.

Controlled by the control signal from the CPU 23, the MPEG processing section 16 performs an MPEG-complying process of decoding the moving-picture data supplied from the demultiplexing section 14, generating uncompressed moving-picture data. The uncompressed moving-picture data, thus generated, is output to the NTSC encoding section 18. That is, the MPEG processing section 16 converts each of the frames composing the moving picture to image data that consists of luminance data item (Y) and color-difference data items (Cr, Cb). (Hereinafter, this image data will be called "YCC image data"). In the conversion process, the MPEG processing section 16 uses the decoding memory 17 as a working storage area. Namely, the moving-picture data items, or the frames, which are to be decoded, are stored in the decoding memory 17.

The MPEG processing section 16 generates YCC image data, in which the luminance data item Y, color-difference data item Cr and color-difference data item Cb have sampling-frequency ratio of 4:2:2. In other words, the YCC image data has a pixel format, wherein the magnitude of each color-difference data items is half the magnitude of the luminance data item Y in both the vertical direction and the horizontal direction. Further, the MPEG processing section 16 generates YCC image data, by reducing the magnitude of the color-difference data items Cr and Cb to half the magnitude of the luminance data item Y in both the vertical direction and the horizontal direction. The YCC image data therefore has a pixel format of 4:2:0 if each odd-numbered line contains no color-difference data item Cb. If each even-numbered line contains no color-difference data item Cr, the YCC image data will have a pixel format of 4:0:2. The format of 4:2:0 will be hereinafter referred to as the representative format. The MPEG processing section 16 may generate not only YCC image data having the pixel format of 4:2:2 or 4:2:0, but also YCC image data having the pixel format of 4:4:4 in which neither the color-difference data item Cr nor the color-difference data item Cb is reduced in magnitude.

Controlled by the control signal supplied from the CPU 23, which represents the compression ratio and the like, the MPEG processing section 16 carries out an MPEG-complying encoding process on the moving-picture data supplied from the NTSC encoding section 18. The moving-picture data is thereby compressed in both time and space, generating compressed moving-picture data. The compressed moving-picture data is output to the demultiplexing section 14. In this process, the MPEG processing section 16 stores the moving-picture data into the decoding memory 17, in units of frames that will be encoded.

The NTSC encoding section 18 encodes the moving-picture data input from the MPEG processing section 16, generating NTSC moving-picture data that can be displayed by the television receiver 4. The NTSC moving-picture data is output from the television receiver 4.

The display control section 19 processes the NTSC moving-picture image supplied from the NTSC encoding section 18, thereby to cause the television receiver 4 to display the NTSC moving-picture image. Whenever necessary, the display control section 19 stores the data to be processed by the section 18, into the display memory 20.

More specifically, the display control section 19 effects a control operation, thus changing the image size to an NTSC image size defined by 720×480 pixels or a HD (High-Definition) image size defined by 1920×1080 pixels. At this time, the display control section 19 uses either the 16-bit information utilized in the pixel format of 4:2:2, i.e., the sampling ratio of the luminance data item Y, color-difference data item Cr and color-difference data item Cb, or the information utilized in the pixel format of 4:2:0, i.e., the sampling ratio of the luminance data item Y, color-difference data item Cr and color-difference data item Cb. The moving-picture data, thus processed, is output to the television receiver 4.

Moreover, the display control section 19 may generate image data of another type of image data shown in FIG. 6. As FIG. 6 shows, the image data of this type defines an image size (pixel x, pixel_y), a scanning mode (interlaced/progressive), a pixel format, a screen aspect ratio, a pixel aspect ratio, and an image size. In the image data of FIG. 6, the pixel_y may be 720 pixels, the image format may be 4:2:2 and the screen aspect ratio is 16:9, defining an image type of 720_422 16×9. The display control section 19 can generates image data of the 720_422_16×9 type and image data of the 720_420_16×9 type, too, both employed in digital TV broadcasting in the United States. Further, the display control section 19 can generate image data of the 576_422_4×3 type and image data of the 522_420_4×3 type, which are image types of PAL (Phase Alternation by Line) system.

The operation input section 21 generates and an operation input signal and outputs the same to the CPU 23 when the user operates a button provided on the STB 3. More precisely, the section 21 generates an operation input signal that stops the moving picture the television receiver 4 is displaying and causes the printer apparatus to print the still picture identical to that moving picture.

In response to the operation input signal supplied from the operation input section 21, the CPU 23 generates a control signal that controls the components of the STB 3.

To make the television receiver 4 display the image represented by the video signal the antenna 2 has received, the CPU 23 supplies the control signal to the demodulating section 11, descrambling section 12, data-converting section 13, demultiplexing section 14 and MPEG processing section 16. The control signals controls the sections 11, 12, 13, 14 and 16, whereby the moving-picture data is demodulated and decrypted, the channel is selected for the data, and the data is decoded in accordance with the MPEG standards.

To acquire a frame of the moving picture in the form of still-picture image data, in response to the operation input signal from the operation input section 21, the CPU 23 generates a control signal. The control signal causes the image memory 15 to store the still-picture data that is stored in the display memory 20 at the time the operation input signal is input.

Furthermore, the CPU 23 controls the data-converting section 13 and the demultiplexing section 14 upon receipt of the operation input signal that instructs the printer apparatus 5 to print the image represented by the sill-picture data. The still-picture data stored in the image memory 15, which is YCC image data consisting of a luminance image item Y and color-difference data items Cr and Cb, is thereby output to the printer apparatus 5 through the data-converting section 13 that is an IEEE1394-complying interface circuit.

In order to transmit the still-picture data to the printer apparatus 5, the data-converting section 13 transmits, under the control of the CPU 23, the asynchronous packet 100 containing such a capture command as shown in FIG. 7 after the subunit ID shown in FIG. 4. The capture command designating receipt of the still-picture data is thereby transmitted to the printer apparatus 5.

As shown in FIG. 7, the capture command contains an operation code (opecode), which is a capture command (CAPTURE) represented as a hexadecimal value $XX_{16}$. Contained in the capture command, following the operation code are operands [0] to [32]. The operand [0] is a subfunction. The operand [1] consists of upper five bits defining source_subunit_type and lower three bits defining source subunit_ID. The operand [2] is source_plug. The operand [3] is status. The operand [4] is dest_plug. The operands [5] to [16] define print_job_ID. The operands [17] to [20] define data_size. The operands [21] and [22] define image_size_x. The operands [23] and [24] define image_size_y. The operands [25] and [26] is image_format specifier. The operands [27] to [29] define "reserved". The operand [30] is Next pic. The operands [31] and [32] define Next page.

Source_subunit_type is the data representing the type of the subunit that is provided in the STB 3 and which transmits the asynchronous packet 100. Source subunit_ID is the ID of the subunit that transmits the asynchronous packet 100. Source plug is the plug number assigned to the subunit that transmits the asynchronous packet 100. Dest_plug is the plug number assigned to the subunit that receives the asynchronous packet 100. Printjob_ID is the ID of the job of printing one still picture. Data_size represents the amount of data which is transmitted from the STB 3 to the printer apparatus 5 to print the still picture. Image_size_x describes the number of pixels arranged in the x direction, which corresponds to the image type shown in FIG. 6. Image_size_y describes the number of pixels arranged in the y direction, which corresponds to the image type. Image_format_specifier is the name of the image type. Reserved is data consisting of any desired number of bits and is used to multiply the number of bits constituting the capture command by a multiple of 4. Once "reserve" is set, the IEEE1394-complying packet can be transmitted in data units each composed of an appropriate number of bits.

As shown in FIG. 8, image_format_specifier contains the name of the image type represented as a hexadecimal value. "Chunky" in the name of the image type designates a still picture that is transmitted, a point after another, from the data-converting section 13 to the printer apparatus 5. "Liner" in the name of the image type designates still picture data that is transmitted, a line after another line, from the data-converting section 13 to the printer apparatus 5.

Image_format_specifier may contain the name of an image type which is represented as a hexadecimal value (Value, Sub-value) as shown in FIG. 9 and which contains no information about the number of pixels, unlike the image type shown in FIG. 8. If this is the case, the number of pixels the printer apparatus 5 prints is defined by image_size_x described in the operands [21] and [22] and image_size_y described in the operands [23] and [24].

If the most significant bit of image_format_specifier describes a hexadecimal value "00" (Meaning: sRGB raw), it indicates that the image data should be transmitted as RGB data to the printer apparatus 5. If the most significant bit and least significant bit of image format specifier describe a hexadecimal value "00" and a hexadecimal value "00" (Type: sRGB raw), respectively, they indicate that RGB data should be transmitted, in the order of: R, G, B, R, G, B. If the least significant bit of image format specifier describes a hexadecimal value "00" and a hexadecimal value "01" (Type: sRGB raw, quadlet), it indicates that RGB data should be transmitted, in the order of: R, G, B, 0, R, G, B, 0, . . . That is, if the most significant bit describes "00", data "0" is transmitted after B and before R, a 4-byte RGB data consisting of R, G, B and 0 will be transmitted as a unit of data.

Further, if the most significant bit of image format_specifier describes a hexadecimal value "01" (Meaning: YCC raw), it indicates that the image data should be transmitted as YCC data to the printer apparatus 5. If the most significant bit and least significant bit of image format specifier describe a hexadecimal value "01" and a hexadecimal value "0X" (X is an indefinite number) (Type: YCC4:2:2 raw/pixel), respectively, they indicate that data of the pixel format of 4:2:2 should be transmitted, a point after another (chunky). If the least significant bit describes a hexadecimal value "1X" (Type: YCC4:2:2 raw/line), it means that data of the pixel format of 4:2:2 should be transmitted, a line after another (liner). If the least significant bit describes a hexadecimal value "8X" (Type: YCC4:2:2 raw/chunky), it means that data of the pixel format, wherein the luminance data item Y, color-difference data item Cr and color-difference data item Cb have sampling-frequency ratio of 4:2:0 should be transmitted, a point after another. If the least significant bit describes a hexadecimal value "9X" (Type: YCC4:2:0 raw/line), it means that data of the pixel format of 4:2:0 should be transmitted, a line after another (liner).

The most significant bit and least significant bit of image_format_specifier may describe a hexadecimal value "01" (Meaning: YCC raw) and any one of hexadecimal values "X0" to "XC", respectively. In this case, a pixel ratio (Pixel ratio 1.00×1.00, Pxel ratio 1.19×1.00 or Pixel ratio 0.89×1.00), a color space ITU-R (International Telecommunications Union-Radiocommunication Sector) BT.709-2, ITU-R BT.6014 or ITU-R BT.1203, and point sequence (chunky) or line sequence (liner) will be designated, thereby transmitting the image data. If the least significant bit of the image format specifier describes any one of hexadecimal values "X0" to "X4", it means that interlaced image data should be transmitted. If the least significant bit describes any one of hexadecimal values "X8" to "XC", it means that progressive image data should be transmitted. If the least significant bit describes any one of hexadecimal values "X0" to "X2" and "X8" to "XA", it means that data complying with ITU-R BT.709-2 should be transmitted. If the least significant bit describes "X3" or "XB", it means that data complying with ITU-R BT.601-4 should be transmitted. If the least significant bit describes "X4" or "XC", it means that data complying with ITU-R BT.1203 (PAL system) should be transmitted.

If the most significant bit of image_format specifier describes a hexadecimal value "10" (Meaning: DCF Object), it means that image data should be transmitted to the printer apparatus 5, in the format (DCF: Design rule for Camera Format) designated by the digital camera. If the most significant bit and least significant bit of the image format specifier describe a hexadecimal value "10" and a hexadecimal value "00" (Type: Exif2.1), respectively, they mean that interlaced image Exif-type data should be transmitted, whose image part contains a JPEG-type header representing the photographing condition and the like. If the least significant bit describes a hexadecimal values "01" (Type: JFIF (JPEG File Interplay Format)), it means that JFIF-type data should be transmitted to the printer apparatus 5. If the least significant bit describes a hexadecimal values "02" (Type; TIFF (Tag Image File Format)), it means that TIFF-type data should be transmitted to the printer apparatus 5. If the least significant bit describes "0F" (Type: JPEG (Joint Photographic Coding Experts Group)), it means that JPEG-type data should be transmitted to the printer apparatus 5.

Further, if the most significant bit of image_format_specifier describes any one of hexadecimal values "80" to "8F", it means that data should be transmitted in any format other than the above-mentioned ones. In this case, the data is transmitted in the format designated by any one of hexadecimal values "00" to "FF".

A hexadecimal value "FE" (Meaning: Special meaning) can be set in the most significant bit of image format specifier, and either a hexadecimal value "00" (Type: Unit Plug defined) or a hexadecimal value "01" (Don't care) can be set in the least significant bit of image_format_specifier.

The data-converting section 13 transmits the asynchronous packet 100 containing the capture command. After receiving ACK (acknowledge) from the printer apparatus 5, the section 13 transmits an asynchronous packet 100 containing still-picture data, to the printer apparatus 5.

The rule of transmitting the still-picture data are as shown in FIGS. 10 to 13.

FIG. 10 shows the sequence of transmitting still-picture data of YCC 4:2:2 pixel format is transmitted, a point after another (chunky), to the printer apparatus 5.

FIG. 11 shows the sequence of transmitting still-picture data of YCC 4:2:0 pixel format is transmitted, a point after another (chunky), to a printer apparatus 5.

FIG. 12 shows the sequence of transmitting still-picture data of YCC 4:2:2 pixel format is transmitted, a line after another (liner), to a printer apparatus 5.

FIG. 13 shows the sequence of transmitting still-picture data of YCC 4:2:0 pixel format is transmitted, a line after another (liner), to a printer apparatus 5.

In FIGS. 10 to 13, $Y_i(L_j)$ indicates the luminance data Y for the pixel #i contained in the line #j. The value i that is used to designate a pixel of the luminance data Y is an integer ranging from 1 to N, whereas the value j is an integer ranging from 1 to M. $Cb_i(L_j)$ indicates the color-difference data Cb for the pixel #i contained in the line #j. The value i that is used to designate a pixel of the color-difference data Cb is 1, 3, 5 . . . or N−1, whereas the value j is an integer ranging from 1 to M for the YCC 4:2:2 pixel format and an integer 1, 3, 5 . . . N−1 for the YCC4:2:0 pixel format. $Cr_i(L_j)$ indicates the color-difference data Cr for the pixel #i contained in the line #j. The value i that is used to designate a pixel of the color-difference data Cr is 1, 3, 5 . . . or N−1, whereas the value j is an integer ranging from 1 to M for the YCC 4:2:2 pixel format and an integer 1, 3, 5 . . . N−1 for the YCC 4:2:0 pixel format. N indicates the total number of pixels existing in one line. M indicates the total number of lines existing in one line.

The data-converting section 13 transmits pixel data as will be described with reference to FIG. 14, in order to transmit still-picture data contained in the asynchronous packet 100, a point after another (chunky), to the printer apparatus 5. Note that the image type of this still-picture data is 480_422_4×3 as shown in FIG. 8. The still-picture data represents pixels, of which those arranged in a line (x direction) are assigned with pixels #1 to #720 and those arranged in a column (y direction) are assigned with lines #1 to #480.

To be more specific, the data-converting section 13 first transmits an address offset (address_offset) and then the luminance data item Y1 (L1), luminance data item Y2 (L1), color-difference data item Cb1 (L1) and color-difference data item Cr1 (L1) pertaining to the pixel #1. Then, the section 13 transmits the other pixels #2 to #720 contained in the line #1. Thereafter, the section 13 transmits the luminance data items and color-difference data items pertaining to the pixels #1 to #720 of the line #480. Thus, the data-converting section 13 finishes transmitting the data representing one still picture, to the printer apparatus 5.

The data-converting section 13 may transmit a still-picture data of the image type of 480_420_4×3 as shown in FIG. 15. In this case, the data-converting section 13 transmits the luminance data items Y1 (L1), Y2 (L1), Y1 (L2) and Y2 (L2), all pertaining to the pixel #1 of line #1, after it has transmitted an address offset (address offset). Then, the section 13 transmits the color-difference data items Cb1(L1) and Cr1(L1) and luminance data items Y3 (L1) and Y4 (L1), all pertaining to the pixel #1. Thereafter, the section 13 transmits the pixel data items representing the other pixels #2 to #720 contained in the line #480. Thus, the data-converting section 13 finishes transmitting the data representing one still picture, to the printer apparatus 5.

The data-converting section 13 may transmit a still-picture data of the image type of 480_422_4×3, contained in an asynchronous packet 100, line after another line. To this end, the data-converting section 13 transmits the luminance data items Y1 (L1), Y2 (L1), Y3 (L1), Y4 (L1), and Y720 (L1), all pertaining to line #1, after it has transmitted an address offset (address offset), as is illustrated in FIG. 16. Then, the section 13 transmits the color-difference data items Cb1 (L1), Cr1 (L1), Cb720 (L1) and Cr720 (L1), all pertaining to line #0. Further, the section 13 transmits the luminance data items and color-difference data items, pertaining to line #2 et seq., thus transmitting color-difference data item Cr720 (L480). The data-converting section 13 then finishes transmitting the data representing one still picture.

The data-converting section 13 may transmit a still-picture data of the image type of 480_420_4×3, contained in an asynchronous packet 100, line after another line. As shown in FIG. 17, the data-converting section 13 transmits the luminance data items Y1 (L1) to Y720 (L1) pertaining to line #1. Next, the section 13 transmits the luminance data items Y1 (L2) to Y720 (L2) pertaining to line #2. Further, the section 13 transmits the color-difference data items Cb1 (L1), Cr1 (L1), Cb720 (L1) and Cr719 (L1), all pertaining to line #1. Thus, the section 13 transmits the pixel data of lines #1 and #12. Thereafter, the section 13 transmits the color-difference data items, pertaining to line #3 et seq., thereby transmitting color-difference data items Cb719 (LA79) to Cr719 (LA79). The data-converting section 13 therefore finishes transmitting the data representing one still picture.

As shown in FIG. 2, the printer apparatus 5 comprises a data input section 31, a ROM (Read Only Memory) 32, a print engine 33, a RAM 34 and a CPU 35. The data input section 31 input receives the still-picture data from the STB 3. The ROM 32 stores a printing control program. The print engine 33 is designed to print image data on printing media. The CPU 35 controls the other components of the printer apparatus 5.

The data input section 31 comprises, for example, an interface circuit that complies with the IEEE1394 standards. Under the control of a control signal supplied from the CPU 35, the section 31 performs IEEE1394-complying signal processing on the still-picture data that is contained in the asynchronous packet 100 transmitted from the STB 3.

To be more specific, the data input section 31 effects processes at the transaction layer, link layer and physical layer, under the control of a serial bus complying with the IEEE1394 standards. The still-picture image that is contained in the asynchronous packet 100 is thereby output from the input section 31 to the CPU 35.

The data input section 31 may be mechanically connected to the STB3 by, for example, an optical cable. In this case, the data-converting section 13 of the STB 3 is connected to the printer apparatus 5 so that the asynchronous packet 100 may be transmitted between the printer apparatus 5 and the data-converting section 13.

The print engine 33 comprises a medium holding/feeding mechanism, a printer head, and a printer head drive mechanism. The print engine 33 prints the still image on a printing medium under the control of the CPU 35.

The CPU 35 generates a control signal that controls the data input section 31 and the print engine 33. At this time the CPU 35 operates in accordance with the printing control program stored in the ROM 32 and controls the contents of the ROM 32, by using the RAM 34 as a working storage area.

Figure 18:
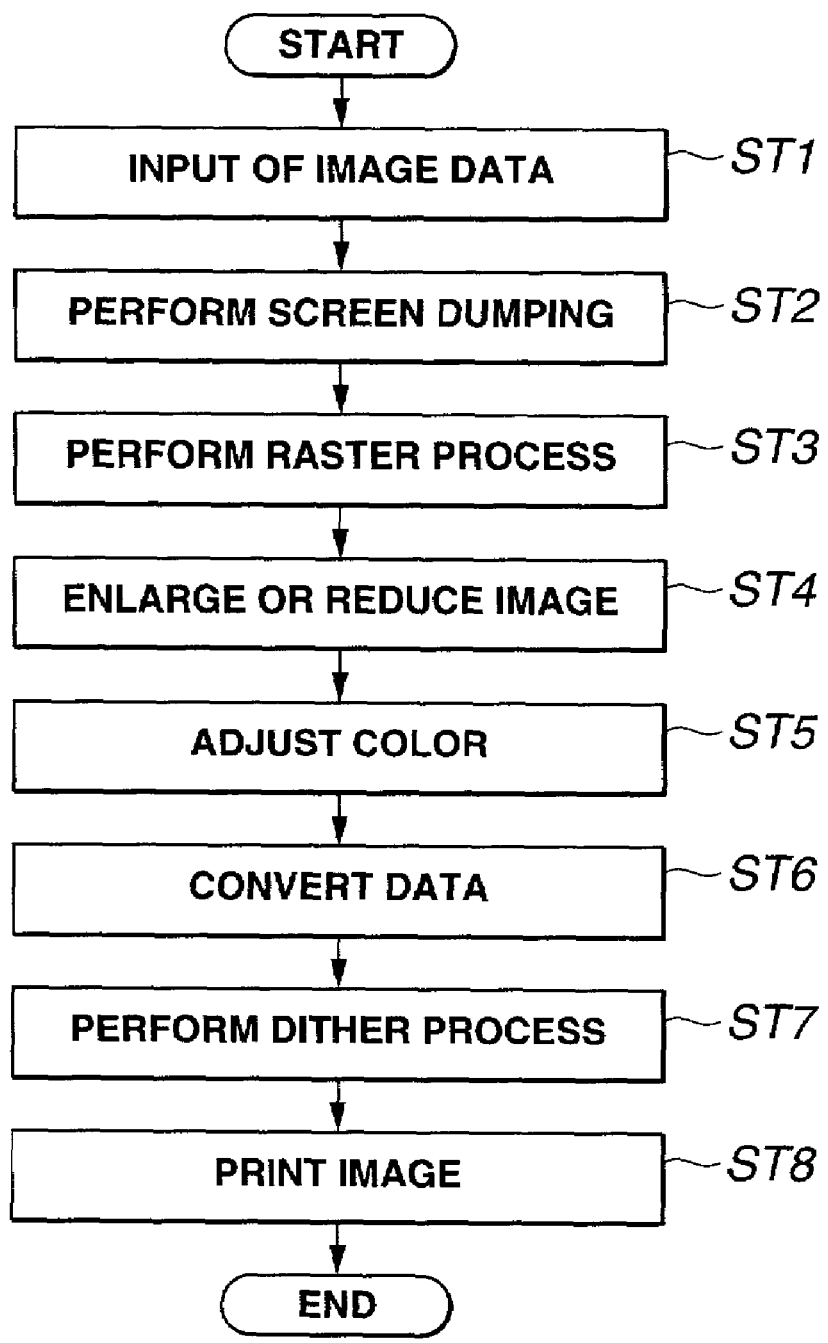
FIG. 18 is a flowchart explaining the sequence of processes the printer apparatus performs to print an image in the image-printing system according to the present invention.

Thus, the CPU 35 operates in accordance with the printing control program, whereby a sequence of operations is performed as shown in the flowchart of FIG. 18.

As shown in FIG. 18, in Step ST1, the data input section 31 of the printer apparatus 5 receives a packet that has been generated in accordance with the IEEE1394 standards. The data input section 31 performs various processes at the transaction layer, link layer and physical layer, which comply with the IEEE1394 standards. Thus, the section 31 extracts a still-picture data, i.e., YCC image data consisting of luminance data items Y and color-difference data items Cr and Cb, from the packet.

In Step ST2, the CPU 35 carries out screen dumping so that everything displayed on the screen of the television receiver 4 may be printed.

In the next step, i.e., Step ST3, the CPU 35 performs raster process on the still-picture data that has been subjected to screen dumping in Step ST2. That is, the CPU 35 converts the still-picture data to dot-image data that can be transferred to the print engine 33.

In Step ST4, the CPU 35 enlarges or reduces the still-picture data that has been subjected to raster process in Step ST3. More precisely, the CPU 35 changes the size of the still picture to be printed, in accordance with the value the user has designated.

In Step ST5, the CPU 35 adjusts colors for the still-picture data that has been subjected to the enlarging/reducing process effected in Step ST4. The still-picture data consisting of luminance data items and color-difference data items is thereby converted to printing data consisting of R (Red), G (Green) and B (Blue) data items.

A pixel value for which a color space is designated in the Y(ITU-R, BT.601-4) format and a pixel value for which a color space is designated by RGB have the relation described below:

$$Y'_{601YCC}=0.299*R'_{RGB}+0.587*G'_{RGB}+0.144*B'_{RGB}$$

$$Cr'_{601YCC}=0.713*(R'_{RGB}-Y'_{601YCC})$$
$$=0.500*R'_{RGB}-0.419*G'_{RGB}-0.081*B'_{RGB}$$

$$Cb'_{601YCC}=0.564*(B'_{RGB}-Y'_{601YCC})$$
$$=0.169*R'_{RGB}-0.331*G'_{RGB}+0.500*B'_{RGB}$$

These equations can be expressed as follows, in 8-bit notation:

$$Y'_{601YCC\_8bit}=(219.0*Y'_{601YC})+16.0$$

$$Cb'_{601YCC\_8bit}=(224.0*Cb'_{601YCC})+128.0$$

$$Cr'_{601YCC\_8bit}=(224.0*Cr'_{601YCC})+128.0$$

The 8-bit value is transmitted as image data from the STB 3 to the printer apparatus 5. In Step ST5, the 8-bit YCC value is converted to RGB data.

A pixel value for which a color space is designated in the Y(ITU-R, BT.709-2) format and a pixel value for which a color space is designated by RGB have the relation described below:

$$Y'_{709YCC}=0.2126*R'_{RGB}+0.7152*G'_{RGB}+0.0722*B'_{RGB}$$

$$Cb'_{709YCC}=0.5389*(B'_{RGB}-Y'_{709YCC})$$

$$Cr'_{709YCC}=0.6350*(R'_{RGB}-Y'_{709YCC})$$

These equations can be expressed as follows, in 8-bit notation:

$$Y'_{709YCC\_8bit} = (219.0 * Y'_{709YC}) + 16.0$$

$$Cb'_{709YCC\_8bit} = (224.0 * Cb'_{709YCC}) + 128.0$$

$$Cr'_{709YCC\_8bit} = (224.0 * Cr'_{709YCC}) + 128.0$$

The 8-bit value is transmitted as image data from the STB 3 to the printer apparatus 5. In Step ST5, the 8-bit YCC value is converted to RGB data.

In Step ST6, the CPU 35 adjust the printing data consisting of R, G and B data items adjusted in terms of color, to cyan, magenta and yellow data items. The ratio of the cyan, magenta and yellow data items for each dot is thereby determined. Then, dither process is performed in Step ST7.

In Step ST8, the CPU 35 outputs the printing data subjected to the dither process in Step ST7, to the print engine 33. The print engine 33 is driven, printing the still picture on a printing medium.

Figure 19:
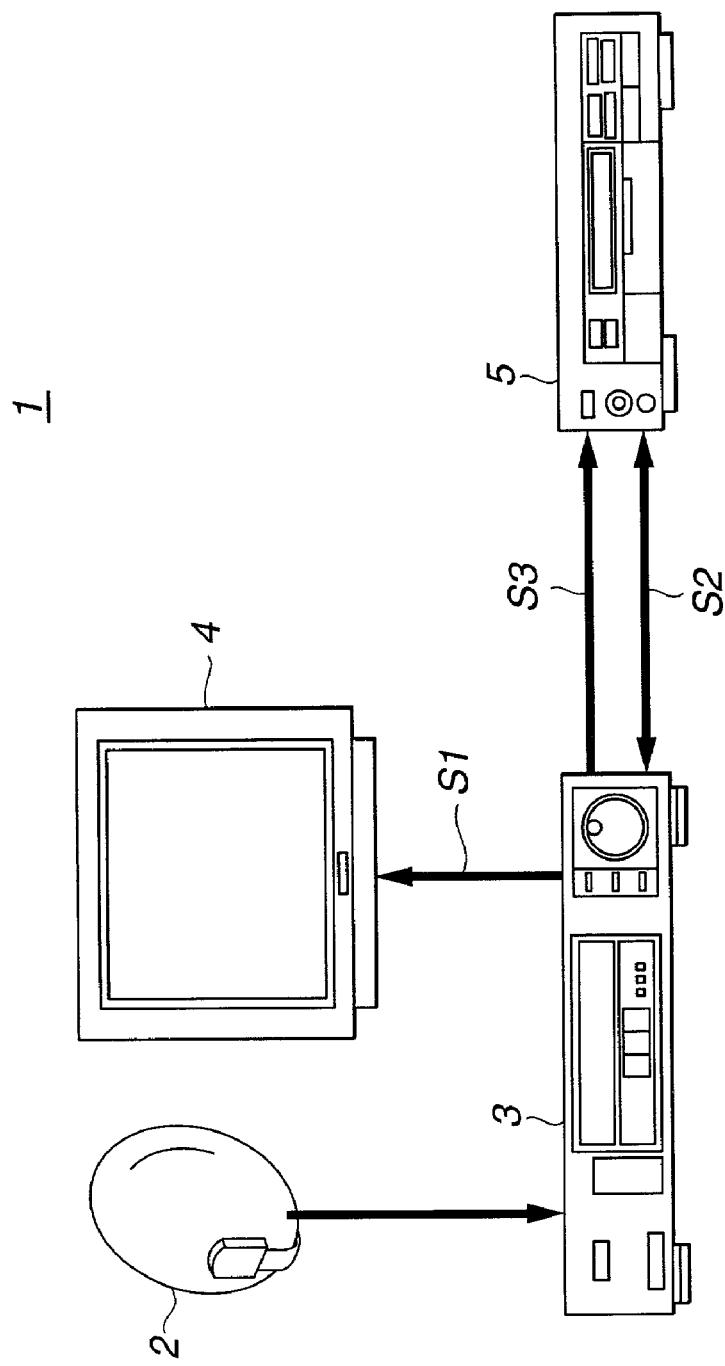
FIG. 19 is a diagram for explaining how the CPU provided in the STB operates to make the printer apparatus print the image the television receiver is displaying.

How the CPU 23 operates to make the printer apparatus 5 print the image represented by the image data received by the STB 3 in the image-printing system 1 described above will be described, with reference to FIGS. 19 and 20.

Figure 20:
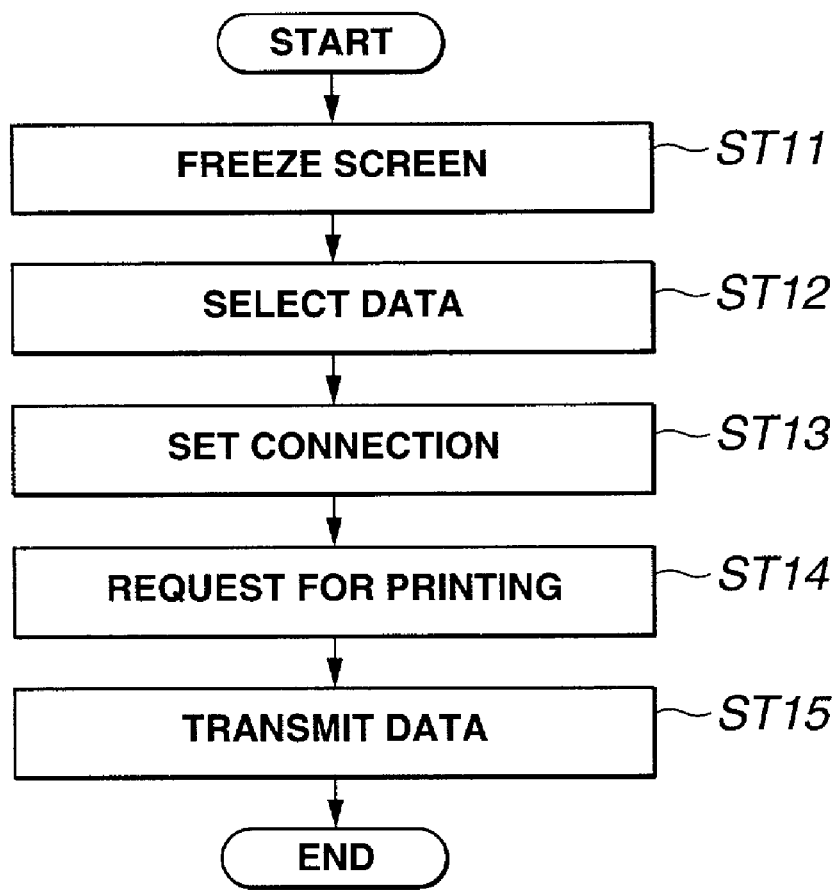
FIG. 20 is a diagram for explaining the sequence of processes the CPU of the STB performs to make the printer apparatus print the image the television receiver is displaying.

As shown in the flowchart of FIG. 20, in Step ST11, the CPU 23 of the STB 3 receives an operation input signal generated as the user pushes a button on the STB 3 to freeze the moving picture displayed by the television apparatus 4. In response to the operation input signal, the CPU 23 controls the display control section 19, which causes the NTSC encoding section 18 to stop outputting the moving-picture data S1 (FIG. 19) to the television receiver 4. As a result, the television receiver 4 displays a still picture.

In the next step, i.e., Step ST12, the CPU 35 selects the still-picture data representing the frame the television receiver 4 is displaying. When an operation input signal is input, instructing that the printer apparatus 5 should print the still picture, the CPU 23 controls the display control section 19, MPEG processing section 16 and demultiplexing section 14 so that the still-picture data (i.e., frame data) stored in the display memory 20 may be read into the image memory 15. In other words, the CPU 23 stores the still-picture data consisting of a luminance data item Y and color-difference data items Cr and Cb, into the image memory 15.

In Step ST13, the CPU 35 controls the data-converting section 13, whereby the STB 3 and the printer apparatus 5 are connected in a mode complying with the IEEE1394 standards. That is, upon receipt of a control signal supplied from the CPU 23 for connecting the STB 3 and the printer apparatus 5, the data-converting section 13 generates a command packet, thereby confirming that a plug is provided between the section 13 and the data input section 31 of the printer apparatus 5. At this time, the data-converting section 13 transmits a command packet (S2) that contains the data representing the transmitting receiving plug, to the data input section 31. The data input section 31 recognizes the data representing the transmitting plug and transmits a command packet S2 containing the data representing a receiving plug that achieves asynchronous connection, to the data-converting section 13. The data-converting section 13 recognizes the data representing the receiving plug of the data input section 31 incorporated in the printer apparatus 5. On the other hand, the data input section 31 recognizes the transmitting plug of the data-converting section 13 provided in the STB 3.

In the next step, i.e., Step ST14, the CPU 23 requests for data items representing the size, direction, position and number of copies, in the still picture should be printed by the printer apparatus 5.

In Step ST15, the CPU 23 controls the demultiplexing section 14 and sequence of operations is performed so that the still-picture data may be output to the printer apparatus 5. Thus controlled, the data-converting section 13 and the demultiplexing section 14 cooperate, generating a data packet (S2) that contains the still-picture data stored in the image memory 15. The data packet (S2) is transmitted from the STB 3 to the printer apparatus 5.

The printer apparatus 5 receives a plurality of data packets, each containing the data representing the receiving plug. If the apparatus 5 determines from this data packet that it has received the entire still-picture data, it prints the image represented by the still-picture data in the size designated, as the CPU 35 performs the sequence of operations shown in FIG. 18.

How the printer apparatus 5 prints the still picture as the asynchronous packet 100 is transferred between the STB 3 and the printer apparatus 5 will be described, with reference to FIG. 21.

Figure 21:
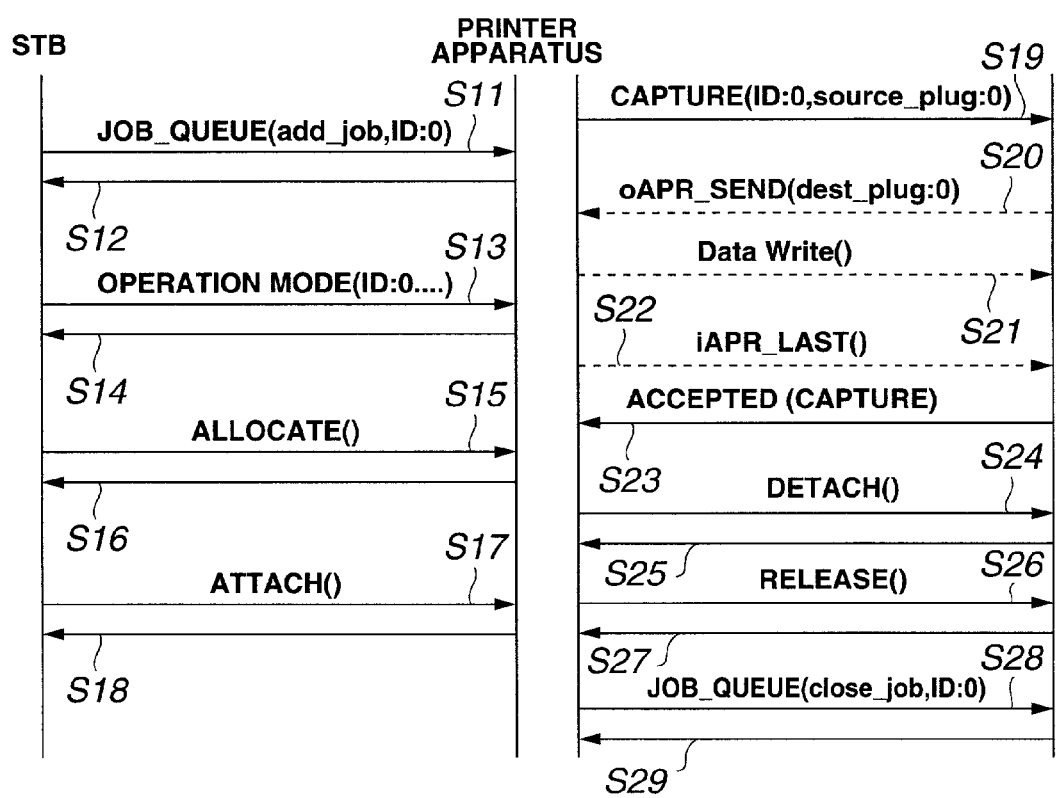
FIG. 21 is a diagram explaining how an asynchronous packet is transferred between the STB and the printer apparatus, thereby to make the printer apparatus print a still picture.

As can be understood from in FIG. 21, the data-converting section 13 has a job of transmitting a command packet (JOB_QUEUE) S11 to the printer apparatus 5 before processing data, so that printer apparatus 5 may print a still picture. Then, the data-converting section 13 receives a response S12 that indicates that the apparatus 5 has received the command packet S11.

The data-converting section 13 transmits a command packet S13 to the printer apparatus 5. This command packet S13 designates the type and size of the printing sheet on which the printer apparatus 5 will print the still picture. The packet S13 designates the quality, color (monochrome/color) and position, too, in which the apparatus 5 will print the still picture. The data-converting section 13 receives a response S14 that indicates that the printer apparatus 5 has received the command packet S13.

The data-converting section 13 sets a plug for transmitting the still-picture data to the data input section 31. More precisely, the STB 3 transmits a command packet S15 containing a command ALLOCATE, to the data input section 31 of the printer apparatus 5. The STB 3 receives a response S16 indicating that the section 31 has received the command packet S15.

The data-converting section 13 sets a plug for transmitting a data packet containing the data that represents the still picture the printer apparatus 5 should print. The section 13 transmits a command packet S17 to the printer apparatus 5, and receives a response S18 showing that the printer apparatus 5 has received the command packet S17.

Next, the data-converting section 13 transmits a command packet S19 that contains a capture command, to the data input section 31. The command packet S19 contains the data (source_plug) that designates the transmitting plug provided in the data-converting section 13. Upon receipt of the command packet S19, the data input section 31 recognizes the transmitting plug provided in the section 13.

The data input section 31 transmits a packet S20, which contains data for setting an oAPR (output Asynchronous Port Register), to the data-converting section 13. Note that the packet S20 contains data (dest_plug) representing the receiving plug that is incorporated in the data input section 31. The data input section 31 transmits a packet S20 containing the data indicating the receiving plug it has recognized upon receipt of the command packet S19. The data-converting section 13 recognizes the receiving plug provided in the data input section 31.

The data-converting section 13 transmits a data packet S21 to the data input section 31. The data packet S21 contains the still-picture data representing a YCC image. The data-converting section 13 divides the still-picture image into data items that are identical in amount. The data items are transmitted to the data input section 31, in the form of data packets S21.

The data-converting section 13 transmits a command packet S22 to the data input section 31. This command packet S22 contains the data about the iAPR (input Asynchronous Port Register), i.e., the flow control register provided in the transmission plug.

Then, the data input section 31 transmits a response packet S23 to the data-converting section 13, informing the section 13 that it has received the capture command.

When the data-converting section 13 receives the response packet S23, it transmits a command packet S24 that contains a DETACH command for disconnecting the printer apparatus 5 from the STB 3. Further, the section 13 receives a response packet S25 from the data input section 31.

The data-converting section 13 transmits a command packet S25 containing a RELEASE command, to the data input section 31. The section 13 receives a response packet S26 from the data input section 31.

Next, the data-converting section 13 transmits a command packet (JOB QUEUE) S28 to the data input section 31. The command packet S28 indicates that the sequence representing the job of printing the still picture has completed. The data-converting section 13 then receives a response packet S29 from the data input section 31.

The image-printing system 1 described above comprises the STB 3 having a IEEE1394-complying data-converting section 13 and the printer apparatus 5 having a data input section 31. The still-picture data stored in the STB 3 can therefore be transferred to the printer apparatus 5, as data contained in the IEEE1394-complying asynchronous packet 100. Hence, the printer apparatus 5 can print the still picture represented by the still-picture data thus transferred. By virtue of high-speed transmission of digital data, in the image-printing system 1.

In the image-printing system 1, the digital still-picture data can be transmitted from the data-converting section 13 provided in the STB 3 to the data input section 31 incorporated in the printer apparatus 5. No signal deterioration occurs during the transmission. The printer apparatus 5 can therefore print a fine image.

Moreover, the printer apparatus 5 (FIG. 19) incorporated in the image-printing system 1 can adjust image data in terms of color. Thus, a frame representing a still picture is extracted from the moving-picture data which represents the image displayed by, for example, the television receiver 4 and which consists of a luminance data item and color-difference data items. The frame, i.e., still-picture data, is transmitted, contained in the asynchronous packet 100, to the printer apparatus 5. The apparatus 5 prints the still picture represented by the still-picture data. Thus, the data-processing performed in the STB 3, i.e., the processing of the image data to be transmitted to the printer apparatus 5, can be rendered simple.

In the above description of the image-printing system 1, the still-picture data, which is not compressed, is transmitted from the STB 3 to the printer apparatus 5, as data contained in the asynchronous packet 100. Alternatively, the data may be compressed into JPEG-type data in the MPEG processing section 16, be contained in the asynchronous packet 100 and then be transmitted. In this case, the amount of data transferred in the image-printing system 1 can be reduced, accomplishing data transmission and image printing at an even higher speed.

In the above description of the image-printing system 1, the STB 3 and the printer apparatus 5 comprise the data-converting section 13 and the data input section 31, respectively, which are IEEE1394-complying interfaces. Nonetheless, the data-converting section 13 and data-converting section 31 may be replaced by interfaces of any other type, such as USB interface circuits. If the STB 3 and printer apparatus 5 have USB interfaces, packets can be transferred between the STB 3 and the printer apparatus 5 in digital-data transmission scheme. This enables the printer apparatus 5 to print fine, high-quality images.

Moreover, the programs that the STB 3 and printer apparatus 5 use to process image data may be provided in the form of a storage medium such as a magnetic disk or an optical disk. If this is the case, the STB 3 and printer apparatus 5 can process the image data, once the programs stored in the storage medium are installed into the STB 3, the printer apparatus 5 or the computer.

INDUSTRIAL APPLICABILITY

As has been described in detail, the image data generated is contained in a packet complying with a predetermined digital serial-bus system, and the packet is output to the printing apparatus, in the image-printing apparatus and method according to this invention. Thus, image data can be output in the form of digital data. The printing apparatus can print an image in as high quality as images displayed on the screens of TV receivers. In addition, the packet output to the printing apparatus contains a capture command and image-type data in the image-printing apparatus and method according to the present invention. Hence, the amount of data that should be transmitted to and received from the printing apparatus decreases, thus reducing the burden of data transfer.

In the printing apparatus and method according to this invention, image data is input that is contained in a packet complying with a predetermined digital serial-bus system. Hence, the image data can be input, as digital data, from an image-processing apparatus. The printing apparatus can therefore print an image in as high quality as images displayed on the screens of TV receivers. Further, the packet output to the printing apparatus contains a capture command and image-type data in the image-printing apparatus and method according to the present invention. Hence, the amount of data that should be transmitted to and received from the printing apparatus decreases, thus reducing the burden of data transfer.

In the image-printing system and image-printing method according to the present invention, the image data generated is contained in a packet complying with a predetermined digital serial-bus system, and the packet is transferred between the image-processing apparatus and the printing apparatus. Thus, the printing apparatus can print an image in as high quality as images displayed on the screens of TV receivers. Moreover, since the packet contains a capture command and image-type data, the amount of data that should be transmitted to and received from the printing apparatus decreases, thus reducing the burden of data transfer.

A storage medium according to the invention stores a program for outputting to a printing apparatus a packet which complies with a predetermined digital serial-bus system and which contains image data generated. If an image-processing apparatus uses the program, it can output digital image data to the printing apparatus. Hence, the printing apparatus can print the image represented by the digital image data, in as high quality as images displayed on, for example, the screens of TV receivers. Furthermore, the amount of data that should be transmitted to and received from the printing apparatus decreases if the program is used. This is because the program is designed to output to the printing apparatus a packet containing a capture command and image-type data. This reduces the burden of data transfer.

Another storage medium according to the invention stores a program for outputting a packet which complies with a predetermined digital serial-bus system and which contains image data generated. If an image-processing apparatus uses the program, it can output digital image data to the printing apparatus. Hence, the printing apparatus can print the image represented by the digital image data, in as high quality as images displayed on, for example, the screens of TV receivers. In addition, the amount of data that should be transferred between an image-processing apparatus and the storage medium decreases if the program is used. This is because the program is designed to input a packet containing a capture command and image-type data. The burden of data transfer is therefore reduced.

What is claimed is:

1. An image-processing apparatus comprising:
   image-processing means for processing an externally input image signal, thereby to generate image data to be supplied to a display apparatus; and
   image output means for deriving from said generated image data a packet, said packet complying with a predetermined digital serial bus system and containing the image data generated by the image-processing means;
   capture command means for inserting into the packet a capture command which includes a set of parameters that define a still-picture derived from said generated image data, said parameters describing image-type data representing a format of the still-picture data, said still-picture data defining said still-picture; and
   means for transmitting said packet to a printing apparatus to print the still-picture defined by said parameters.

2. The image-processing apparatus comprising according to claim 1, wherein the image output means outputs the packet to the printing apparatus, after inserting luminance data and color-difference data into the packet.

3. The image-processing apparatus comprising according to claim 1, wherein the packet complying with the predetermined digital serial bus system is one complying with IEEE (The Institute of Electrical and Electronics Engineers) 1394 standards.

4. The image-processing apparatus comprising according to claim 3, wherein the packet is one that achieves asynchronous communication in which commands are transmitted by using FCP (Function Control Protocol).

5. An image-processing method comprising the steps of:
   processing an externally input image signal, thereby to generate image data to be supplied to a display apparatus;
   inserting the generated image data into a packet that complies with a predetermined digital serial bus system;
   inserting, into the packet, a capture command which includes a set of parameters that define a still-picture derived from said generated image data, said parameters describing image-type data representing a format of the still-picture data, said still-picture data defining said still-picture; and
   outputting the packet to a printing apparatus to print the still-picture defined by said parameters.

6. The image-processing method according to claim 5, wherein image data composed of luminance data and color-difference data are inserted into the packet before the packet is output to the printing apparatus.

7. The image-processing method according to claim 5, wherein the packet complying with the predetermined digital serial bus system is one complying with IEEE (The Institute of Electrical and Electronics Engineers) 1394 standards.

8. The image-processing method according to claim 7, wherein the packet is one that achieves asynchronous communication in which commands are transmitted by using FCP (Function Control Protocol).

9. A printing apparatus comprising:
   image input means for receiving image data of a prescribed format, which is contained in a packet complying with a predetermined digital serial bus system;
   image-converting means for converting the format of the image data input to the image input means to a format for printing; and
   printing means for printing still-picture image data based on the image data of the format converted by the image-converting means;
   wherein the packet contains a capture command designating transmission of the still-picture data and describing image-type data representing the format of the still-picture data, said capture command includes a set of parameters that define a still-picture derived from said generated image data; and
   wherein the image-converting means converts the format in accordance with the image-type data described in the capture command.

10. The printing apparatus according to claim 9, wherein the image input means inputs image data composed of luminance data and color-difference data, and the image-converting means converts the image data composed of luminance data and color-difference data, to image data of the format for printing.

11. The printing apparatus according to claim 9, wherein the packet complying with the predetermined digital serial bus system is one complying with IEEE (The Institute of Electrical and Electronics Engineers) 1394 standards.

12. The printing apparatus according to claim 11, wherein the packet is one that achieves asynchronous communication in which commands are transmitted by using FCP (Function Control Protocol).

13. A printing method comprising the steps of:
   receiving a packet complying with a predetermined digital serial bus system and containing image data and a capture command designating transmission of still-picture data based on the image data;
   converting the format of the image data received, to a format for printing, in accordance with image-type data described in the capture command and representing the format of the still-picture data received; and
   printing still-picture image data based on the image data of the format converted;
   wherein said capture command includes a set of parameters that define a still-picture derived from said generated image data.

14. The printing method according to claim 13, wherein image data composed of luminance data and color-difference data is received and converted to image data of the format for printing.

15. The printing method according to claim 13, wherein the packet complying with the predetermined digital serial bus system is one complying with IEEE (The Institute of Electrical and Electronics Engineers) 1394 standards.

16. The printing method according to claim 15, wherein the packet is one that achieves asynchronous communication in which commands are transmitted by using FCP (Function Control Protocol).

17. An image-printing system comprising:
an image-processing apparatus comprising image-processing means for processing an externally input image signal, thereby to generate image data to be supplied to a display apparatus; and
image output means for deriving from said generated image data a packet, said packet complying with a predetermined digital serial bus system and containing the image data generated by the image-processing means;
capture command means for inserting into the packet a capture command which includes a set of parameters that define a still-picture derived from said generated image data, said parameters describing, image-type data representing a format of the still-picture data, said still-picture data defining said still-picture; and
means for transmitting said packet to a printing apparatus to print the still-picture defined by said parameters; and
a printing apparatus comprising
image input means for receiving image data of a prescribed format, which is contained in a packet complying with a predetermined digital serial bus system;
image-converting means for converting the format of the image data input to the image input means to a format for printing; and
printing means for printing still-picture image data based on the image data of the format converted by the image-converting means;
wherein the image-converting means converts the format in accordance with the image-type data described in the capture command.

18. The image-printing system according to claim 17,
wherein the image output means of the image-processing apparatus outputs the packet to the printing apparatus, after inserting luminance data and color-difference data into the packet, the image input means of the printing apparatus inputs image data composed of luminance data and color-difference data, and
wherein the image-converting means of the printing apparatus converts the image data composed of luminance data and color-difference data, to image data of the format for printing.

19. The image-printing system according to claim 17, wherein the packet complying with the predetermined digital serial bus system is one complying with IEEE (The Institute of Electrical and Electronics Engineers) 1394 standards.

20. The image-printing system according to claim 19, wherein the packet is one that achieves asynchronous communication in which commands are transmitted by using FCP (Function Control Protocol).

21. An image-printing method comprising the steps of:
processing an externally input image signal, thereby to generate image data to be supplied to a display apparatus;
inserting the generated image data, into a packet that complies with a predetermined digital serial bus system;
inserting, into the packet, a capture command which includes a set of parameters that define a still-picture derived from said generated image data, said parameters describing, image-type data representing a format of the still-picture data, said still-picture data defining said still-picture;
transmitting the packet;
receiving the packet complying with the predetermined digital serial bus system and containing the image data and the capture command;
converting the format of the image data received, to a format for printing, in accordance with image-type data described in the capture command and representing the format of the still-picture data received; and
printing still-picture image data based on the image data of the format converted.

22. The image-printing method according to claim 21, wherein image data composed of luminance data and color-difference data is inserted into the packet and the packet is then output,
image data composed of luminance data and color-difference data is received, and image data composed of luminance data and color-difference data is converted to a format for printing.

23. The image-printing method according to claim 21, wherein the packet complying with the predetermined digital serial bus system is one complying with IEEE (The Institute of Electrical and Electronics Engineers) 1394 standards.

24. The image-printing method according to claim 21, wherein the packet is one that achieves asynchronous communication in which commands are transmitted by using FCP (Function Control Protocol).

25. A computer readable medium storing an image-processing program that describes the steps of:
processing an externally input image signal, thereby to generate image data to be supplied to a display apparatus;
inserting the generated image data, into a packet that complies with a predetermined digital serial bus system;
inserting, into the packet, a capture command which includes a set of parameters that define a still-picture derived from said generated image data, said parameters describing image-type data representing a format of the still-picture data, said still-picture data defining said still-picture; and
outputting the packet to a printing apparatus.

26. A computer readable medium storing an image-processing program that describes the steps of:
receiving a packet complying with a predetermined digital serial bus system and containing image data and a capture command;
converting the format of the image data received, to a format for printing, in accordance with image-type data described in the capture command and representing the format of still-picture data received; and
printing still-picture image data based on the image data of the format converted;
wherein said capture command includes a set of parameters that define a still-picture derived from said generated image data.

* * * * *